United States Patent [19]
Holsinger

[11] Patent Number: 5,078,460
[45] Date of Patent: Jan. 7, 1992

[54] PORTABLE WORK STATION

[76] Inventor: Melvin L. Holsinger, 8720 N. Newport Pl., Tucson, Ariz. 85704

[21] Appl. No.: 614,156

[22] Filed: Nov. 16, 1990

[51] Int. Cl.⁵ .............................................. A47B 41/00
[52] U.S. Cl. ..................................... 312/244; 312/241; 312/282
[58] Field of Search ................. 312/282, 241, 311, 244

[56] References Cited

U.S. PATENT DOCUMENTS

| | | | |
|---|---|---|---|
| 4,252 | 11/1845 | White | 312/282 |
| 586,185 | 7/1897 | Herrick et al. | 312/282 X |
| 3,904,003 | 9/1975 | Margerum | 312/241 X |
| 4,592,603 | 6/1986 | Adams et al. | 312/282 X |

Primary Examiner—Joseph Falk
Attorney, Agent, or Firm—Antonio R. Durando; Harry M. Weiss

[57] ABSTRACT

A portable work station that can be folded into a compact unit with the appearance of a briefcase. The unit is designed to give the user the comfort and efficiency of an office environment by providing easy access to supplies used in the course of his or her work. The unit opens up to form a rigid desk top for writing and supporting portable equipment, such as computers, and provides various shelves for holding supplies and work material during use. A set of drawers function as regular desk drawers for storage and access to needed material. During transportation of the unit, the same drawers provide storage like a standard briefcase.

16 Claims, 1 Drawing Sheet

PORTABLE WORK STATION

BACKGROUND OF THE INVENTION

1. Field of the Invention

This invention is related in general to the fields of portable office equipment and work stations. In particular, the invention provides a portable work station in the form of a compact briefcase for convenient use by travelers to reproduce a business desk environment while away from the office.

2. Description of the Prior Art

For centuries people have been carrying with them the tools of their trade stored in all kinds of briefcases and bags tailored to fit the character of their occupation. Mostly, these bags have been sized and compartmentalized to carry the maximum amount of material in a minimum amount of overall space. Because of the common use of calculators, beepers, pagers, portable telephones, and other modern business accessories, recent briefcase models have featured special receptacles designed to accommodate these devices as well.

With the advent of the portable computer, it has become possible to work productively virtually anywhere the machine can be set up. Files can be stored and transported in floppy and hard disks; writing, editing, and computing can be performed directly by interacting with the machine through the keyboard; and all other traditional tools, such as notebooks, pencils and erasers, have become merely accessories. The computer itself is the centerpiece of the modern work station. Thus, when a portable computer is used away from the office, it is important that the necessary support accessories be available for the convenient and efficient utilization of the instrument.

The most critical component for an efficient work environment is an appropriate desk top for the computer. When traveling, people normally hold the computer on their lap, or lay it down on an empty seat next to them, while they carry out their work. If they use their briefcase as a support platform, they have to remove the computer every time they need access to material inside the case. As a result of this makeshift approach, the work environment tends to be disorganized and cumbersome. Therefore, there is a need for a device designed to provide an efficient work station in conjunction with the use of portable computers and other similar portable equipment.

BRIEF SUMMARY OF THE INVENTION

One objective of this invention is the development of a portable work station for use in conjunction with portable computers. This is obtained by providing a compact unit that folds open to form a desk top capable of supporting a standard portable computer.

Another objective of the invention is an apparatus that can be adjusted to provide a level surface when used on the seat of a car, airplane, or similar means of transportation. Thus, the work station of this invention may be equipped with lateral supports that adjustably prop it into forming a horizontal desk top when lying on an uneven surface.

A further goal of the invention is to incorporate various compartments for storing office supplies and accessories, such as scissors, notebooks, and the like. Therefore, this portable work station includes slidable drawers that provide sufficient space and appropriate fasteners for holding the required material.

Yet another goal of the invention is a unit that can be carried easily and conveniently. To that end, the portable work station described herein is assembled in the shape of a regular briefcase and features a standard briefcase handle for carrying it around.

A final objective is the easy and economical manufacture of the case according to the above stated criteria. This is achieved by using commercially available components and materials, modified only to the extent necessary to fit the requirements of the invention.

Therefore, according to these and other objectives, the present invention describes a portable work station folded into a compact unit with the appearance of a briefcase. The unit is designed to give the user the comfort and efficiency of an office environment by providing easy access to supplies used in the course of his or her work. The unit opens up to form a rigid desk top for writing and supporting portable equipment and various shelves for holding supplies and work material during use. A set of drawers provide the function of regular desk drawers for storage and access to needed material. During transportation of the unit, the same drawers provide storage like a standard briefcase.

Various other purposes and advantages of the invention will become clear from its description in the specifications that follow and from the novel features particularly pointed out in the appended claims. Therefore, to the accomplishment of the objectives described above, this invention consists of the features hereinafter illustrated in the drawings, fully described in the detailed description of the preferred embodiments and particularly pointed out in the claims. However, such drawings and description disclose only two of the various ways in which the invention may be practiced.

DETAILED DESCRIPTION OF THE INVENTION

This invention consists of the application of simple mechanical principles in combination with known structural components to achieve a practical and economical design for a portable work station with the properties described above. The main point of the invention lies in the recognition of the fact that a briefcase type of structure can be used to create a portable unit that can be transformed into a desk top with drawers and shelves in any environment where a user wishes to set up a work station. The invention is intended mainly for people who spend a significant amount of time traveling, such as sales personnel, real estate brokers, and construction managers. It would be very useful for these people to have at their disposal the amenities of an office desk while on the road. With the portable apparatus of this invention, they can transform the seat of an automobile into a work station with many of the features of their office desk. In addition, the invention retains the briefcase capabilities for storage and transportation of material and supplies.

Figure 1:
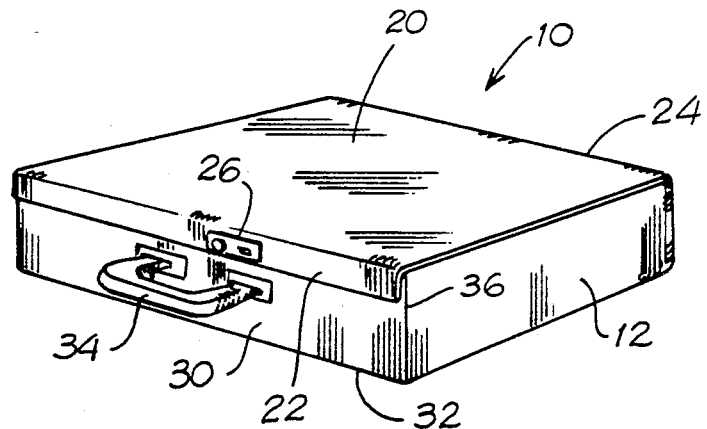
FIG. 1 is a perspective view of the portable work station of this invention.
Figure 2:
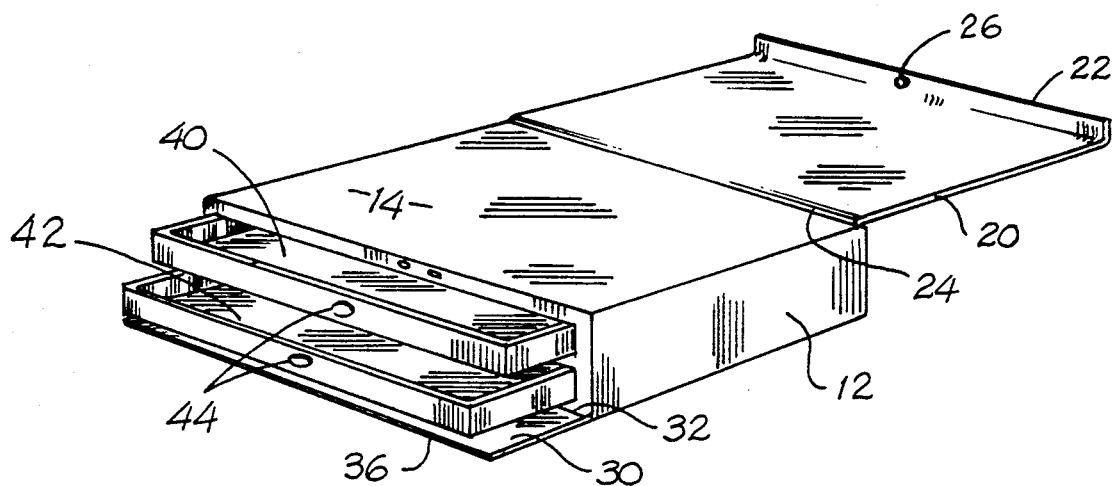
FIG. 2 is prospective view of the same work station of FIG. 1 after it has been opened to form a desk top and provide access to its various storage and shelving compartments.

Referring now to the drawings, wherein like parts are designated throughout with like numerals and symbols, FIG. 1 illustrates in perspective view the portable work station 10 of this invention as it appears before it is folded open. Very similar in size and exterior appearance to a standard briefcase, the work station 10 consists of a strong and stiff main shell 12 with several attachments to provide the desired functions when the unit is opened for use. As more clearly seen in FIG. 2, which shows the work station in an open position, the main shell 12 provides the structural support for the unit and features a rigid flat surface 14 for use as a desk top. A corresponding, rigid, top cover 20 is hinged to the main shell along the top back edge 24, so that it can be folded open 180 degrees to form a continuous plane with the surface 14 and effectively double the area available for use as a desk top. The open position of the top cover 20 is secured by sturdy 180 degree hinges (not shown in the figures). Alternatively, any device normally used to hold an open cover in position could be employed, such as braces or brackets, as would be obvious to one skilled in the art.

The main shell 12 houses drawers 40 and 42 that can be used to store supplies and accessories to be carried around for use away from the office. These drawers slide open for access to their contents and finger holds 44 are provided for easy operation. A rigid drawer cover 30, hinged on the bottom front edge 32 of the main shell 12, folds open at an angle of approximately 90 degrees to form a functional shelf to hold papers and similar material. Sufficient separation from the bottom drawer 42 is provided to allow its opening and closing without interference with the use of the cover 30 as a shelf. In its closed position, the cover 30 is folded over the closed drawers to keep them in place and is overlapped by the lip 22 of the top cover 20. The lip 22, which also provides a retaining rim for the desk top when the top cover 20 is in its open position, is resilient and designed to fit tightly over the upper edge of the cover 30. A standard lock 26 is incorporated into the lip 22 to engage a corresponding latch mounted on the edge 36 of the cover 30 in order to hold the work station shut. Of course, any comparable fastening device could be used to obtain equivalent results. When the unit is completely folded, the handle 34 can be used to transport it like a regular briefcase.

Figure 3:
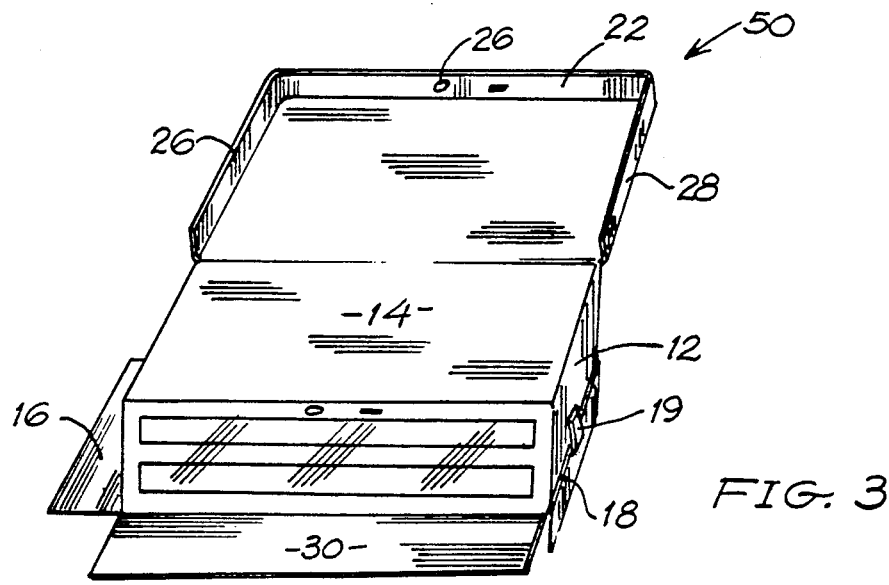
FIG. 3 is an illustration of another embodiment of the invention that includes additional shelving and an adjustable support to level the desk top.

In alternative embodiments of the invention, the portable work station features two additional, rigid, side covers hinged to the top or bottom lateral edges of the main shell 12. Both covers can be used either as additional shelves (folded open at an angle of approximately 90 degrees) for holding material during use of the work station, or as supporting adjustments (folded open at 180 degrees) for keeping the desk top on a horizontal plane when the work station is set up on a slanted surface, such as the typical car seat. One example of this configuration is shown in the work station 50 illustrated in FIG. 3, wherein one side cover is used as a shelf 16 and the other side cover is adapted, instead, for use as a support 18. The support 18 is not as wide as the shelf 16, which is equal to the thickness of the main shell 12. In general, it is found that a width of approximately two inches provides the necessary adjustment to keep the unit leveled on a car seat. The support 18 is kept open by a stay 19, or equivalent standard hardware, that also gives it the structural strength to retain its vertical position when the work station's top is loaded with the weight of a portable computer. In their closed position, the shelf 16 and the support 18 are both kept in place by standard fasteners (not shown in the figures) such as snaps or Velcro ® strips. In addition, the lip 22 could be extended to the side edges of the top cover 20 to form lips 26 and 28, so as to overlap the side covers and keep them in a folded position, even without the use of fasteners, when the work station is closed. Of course, both side covers are overlapped only when used as shelves with the same width as the main shell 12, as opposed to the model shown in FIG. 3 where one side features a shelf 16 and the other side a narrower support 18. Thus, a compact unit results that can be easily transported with all of its contents. When needed, the unit opens up and extends in all horizontal directions to form a ready-to-use work station, complete with drawers and a top to work on. As applicable, a computer or any other portable equipment can be positioned on top of the work station for easy and efficient operation.

While the embodiments shown in the figures feature the specific shapes therein described, the invention can obviously take other shapes with equivalent functionality and utility. In fact, any shapes for the main shell and the various covers that retain the functional characteristics described above provide an acceptable apparatus to practice the invention. The number of drawers and the hardware provided to open and close them can be varied in obvious ways without affecting the scope of this disclosure. Similarly, a variety of drawer compartments and fasteners can be introduced by one skilled in the art to fit the particular needs of specific users.

The work station of this invention is sized to fold into a unit approximating a large briefcase for ease of portability, but the same functional principles can be applied to units of any practical dimensions. It has been found that reinforced cardboard covered with vinyl or leather, of the type normally used in the construction of briefcase frames, is particularly suitable for the manufacture of the various structural components of the invention because of its strength and relatively low cost. Common hardware is used to assemble them. Thin layers of wood can also be used, particularly to create a desk top appearance when the work station is set up. Nevertheless, any durable material would be equivalently adequate and acceptable to practice the invention.

Various changes in the details, steps and materials that have been described may be made by those skilled in the art within the principles and scope of the invention herein illustrated and defined in the appended claims. Therefore, while the present invention has been shown and described herein in what is believed to be the most practical and preferred embodiment, it is recognized that departures can be made therefrom within the scope of the invention, which is therefore not to be limited to the details disclosed herein but is to be accorded the full scope of the claims, so as to embrace any and all equivalent apparatus and methods.

What I claim as my invention is:

1. A portable work station for carrying office supplies to a work location where it can be set up to provide a desk top, comprising:
   (a) a main shell, to provide structural support for said work station, wherein the top surface is rigid and flat for use as a desk top;
   (b) a rigid top cover, hinged on the top back edge of said main shell, so that it can be folded open to form a continuous plane with said top surface and effectively double the area available for use as a desk top;

(c) a set of at least one drawer, slidably enclosed in said main shell, for storing and transporting office supplies and accessories;

(d) a rigid drawer cover, hinged on the bottom front edge of said main shell and capable of folding open at an angle of approximately 90 degrees for providing a functional shelf to hold papers and similar work material, whereas in its closed position said drawer cover is folded over said set of at least one drawer to keep it in place;

(e) two rigid side covers, hinged on the lateral edges of said main shell and capable of folding open at an angle of approximately 90 degrees to provide additional shelves for holding material during use of the work station;

(f) means for retaining said top cover, said drawer cover, and said side covers in a shut position when they are folded closed; and (g) a handle, attached to said drawer cover, for use during transport of the work station.

2. The work station described in claim 1, wherein said top cover includes a lip that provides a retaining rim when used as a desk top and is capable of overlapping the top edge of said drawer cover when both covers are in a closed position.

3. The work station described in claim 2, wherein said means for retaining said top cover and said drawer cover in a shut position when they are folded closed consists of a standard briefcase lock mounted on said top cover lip for engagement with a corresponding latch mounted on said drawer cover.

4. The work station described in claim 3, wherein any drawer in said set of at least one drawer is compartmentalized and equipped with fasteners for holding office accessories in place during transport of the work station.

5. The work station described in claim 4, wherein all drawers in said set of at least one drawer include a finger hold for easy opening and closing of said drawers.

6. The work station described in claim 5, wherein said means for retaining said side covers in a shut position when they are folded closed consists of overlapping lips on the lateral edges of said top cover.

7. The work station described in claim 6, wherein said means for retaining said side covers in a shut position when they are folded closed further consists of mechanical fasteners.

8. The work station described in claim 7, wherein at least one of said side covers is modified to provide a supporting adjustment for keeping said work station on a horizontal plane when it is set up on a slanted surface.

9. A method for reproducing a business desk environment while away from the office by carrying a work station and office supplies to a work location where it can be set up to provide a desk facility, comprising the following steps:

(a) providing a main shell to constitute the structural support for said work station, wherein the top surface is rigid and flat for use as a desk top;

(b) providing a rigid top cover, hinged on the top back edge of said main shell, so that it can be folded open to form a continuous plane with said top surface and effectively double the area available for use as a desk top;

(c) providing a set of at least one drawer, slidably enclosed in said main shell, for storing and transporting office supplies and accessories;

(d) providing a rigid drawer cover, hinged on the bottom front edge of said main shell and capable of folding open at an angle of approximately 90 degrees to form a functional shelf to hold papers and similar work material, whereas in its closed position said drawer cover is folded over said set of at least one drawer to keep it in place;

(e) providing two rigid side covers, hinged on the lateral edges of said main shell and capable of folding open at an angle of approximately 90 degrees to form additional shelves for holding material during use of the work station;

(f) providing means for retaining said top cover, said drawer cover, and said side covers in a shut position when they are folded closed;

(g) providing a handle, attached to said drawer cover, for use during transport of the work station; and (h) carrying said work station and office supplies to a work location and setting it up to provide a desk facility for use in conjunction with portable equipment.

10. The method described in claim 9, wherein said top cover includes a lip that provides a retaining rim when used as a desk top and is capable of overlapping the top edge of said drawer cover when both covers are in a closed position.

11. The method described in claim 10, wherein said means for retaining said top cover and said drawer cover in a shut position when they are folded closed consists of a standard briefcase lock mounted on said top cover lip for engagement with a corresponding latch mounted on said drawer cover.

12. The method described in claim 11, wherein any drawer in said set of at least one drawer is compartmentalized and equipped with fasteners for holding office accessories in place during transport of the method.

13. The method described in claim 12, wherein all drawers in said set of at least one drawer include a finger hold for easy opening and closing of said drawers.

14. The method described in claim 13, wherein said means for retaining said side covers in a shut position when they are folded closed consists of overlapping lips on the lateral edges of said top cover.

15. The method described in claim 14, wherein said means for retaining said side covers in a shut position when they are folded closed further consists of Velcro ® strips.

16. The method described in claim 15, wherein at least one of said side covers is modified to provide a supporting adjustment for keeping said method on a horizontal plane when it is set up on a slanted surface.

* * * * *